Patent  [15] 3,638,708
Farin  [45] Feb. 1, 1972

[54] METHODS OF MULTIPLE STAGE EVAPORATION FROM HEAT SOURCES OTHER THAN STEAM

[72] Inventor: William G. Farin, 707 Elm St., Neenah, Wis. 54956

[73] Assignee: Marathon Engineering Inc., Menaska, Wis.

[22] Filed: June 11, 1969

[21] Appl. No.: 832,309

[52] U.S. Cl. ........................159/47 WL, 159/4 VM, 159/4 A
[51] Int. Cl. ...........................B01d 1/00, B01d 1/16
[58] Field of Search ..................159/47 WL, 4 A, 13 A, 13 C, 159/4 CC, 4 VM, 16 A, 16 B, 16; 55/93, 94, 73; 261/148

[56] References Cited

UNITED STATES PATENTS

| | | | |
|---|---|---|---|
| 2,343,027 | 2/1944 | Ramen | 159/48 |
| 2,770,295 | 11/1956 | Allen, Jr. | 159/16 A |
| 2,839,122 | 6/1958 | Laquiharre | 159/4 A |
| 2,901,061 | 8/1959 | Hartig | 55/73 |
| 3,323,289 | 6/1967 | Venemark | 55/73 |
| 2,764,234 | 9/1956 | Rauh | 159/16 A |

*Primary Examiner*—Norman Yudkoff
*Assistant Examiner*—David Edwards

[57] ABSTRACT

A method of multiple stage evaporation incorporating direct contact evaporation, with the flue gas utilized to heat water, the heated water utilized to heat liquor for flash evaporation to a vacuum. The condensed vapors are then used to heat liquor that is air contact evaporated to provide 3 stages of evaporation. Low-quality flue gas heat is also used to heat liquor for air contact evaporation.

3 Claims, 2 Drawing Figures

METHODS OF MULTIPLE STAGE EVAPORATION FROM HEAT SOURCES OTHER THAN STEAM

BACKGROUND OF THE INVENTION

The concentration of chemicals, waste liquors and solids obtained from waste disposal and pollution control processes is a serious problem facing industry and municipalities. The destruction of wastes by burning is feasible in many cases when concentration can be economically accomplished. However, the burning process often creates added problems due to the air pollution encountered.

Suspended solids can normally be economically concentrated in clarifiers, vacuum deckers, screens, centrifuges, or presses. Soluble solids are more difficult to concentrate. The evaporation needed for concentration is often uneconomical.

A process to handle some of these problems for spent pulp mill liquors is disclosed and claimed in my prior U.S. Pat. No. 3,425,477 issued Feb. 4, 1969, "Methods for Heat Recovery In Evaporating and Burning Spent Liquor." The subject invention incorporates many improvements in these methods that expand its application to the concentration of all chemicals, waste products and solids at lower capital cost and improved economy of operation.

These new methods enable economical concentration by burning commercial fuel, the concentrated product waste, or a combination thereof to satisfy evaporation heat requirements, and utilizing the heat generated in a multiple manner. The very low quality heat normally discharged to the atmosphere can now be utilized by air contact evaporation.

It addition to utilizing the heat recovered for evaporation and concentration of waste products, the system enables removal of air pollutants and the thermal pollution normally encountered in the condensation of water vapor from evaporator operations.

It is the main purpose of this invention to provide a more efficient evaporation process to concentrate soluble waste products and chemicals for disposal, sales and pollution abatement.

Another objective of this invention is to provide a more economical method of concentrating solutions by evaporation utilizing heat sources other than steam.

Another object of this invention is to provide means of concentrating soluble waste products utilizing waste heat sources.

Another object of this invention is to prevent air pollution in the evaporation and burning of soluble waste products.

Another object of this invention is to provide more efficient evaporation while eliminating cooling water requirements and thermal pollution from evaporation.

Another object of this invention is to combine oxidation in an evaporation step to reduce air pollution.

SUMMARY OF THE INVENTION

In this invention, the flue gas used for evaporation may be generated by burning gas, oil, coal, the concentrated waste products, concentrated liquor, or any combination thereof to provide the necessary heat required for evaporation. Firing may be done in a burner, furnace, incinerator, fluidized bed reactor, reduction furnace, boiler or a recovery boiler.

The hot flue gas generated by such burning may have a portion of the heat utilized for the production of steam or power, with the balance of the heat used for evaporation, or all of the heat generated may be used for evaporation. Evaporation may be caused to take place in any one, two or all three of the following stages:

1. Direct contact evaporation stage
2. Heat recovery vacuum evaporation stage
3. Air contact evaporation stage In the direct contact evaporation stage, the hot flue gas is placed in direct contact with the chemical, waste product or liquor being concentrated and contact is maintained for a sufficient period to cool the flue gas to near its saturation temperature by evaporation of water from said chemical, waste product or liquor being concentrated.

Direct contact evaporation may be done in a venturi scrubber, submerged combustion evaporator, spray tower or in a fluidized bed reactor or incinerator where the waste is carried countercurrent to the gas flow so that it is predried by the flue gas and then burned when dried sufficiently to support combustion.

The flue gas saturated by direct contact evaporation still maintains the full heat value but such value is in the form of latent heat of the contained water vapor. This flue gas is then scrubbed and cooled by a circulating stream of water or condensate to recover the heat of condensation derived from the reduced saturated water vapor content at lower flue gas temperatures. The water is heated by countercurrent flow of the flue gas to provide the heat media for heat recovery vacuum evaporation. The scrubbing may also be utilized to recover chemicals released by burning and direct contact evaporation and to prevent air pollution.

Scrubbing of the flue gas and concomitant chemical recovery may be accomplished in three different ways. In the first method, chemical recovery is incorporated in the heat recovery stage so that the water or condensate heated with or without chemical addition is also utilized to recover chemicals or contaminants from the flue gas. As noted below, a flue gas contaminant such as sulfur dioxide, for instance is removed more effectively by the addition of an alkaline chemical such as calcium hydroxide. The calcium bisulfite produced is recoverable in solution for reuse as long as the dilution from the condensate produced is not objectionable.

In the second method, chemicals can be recovered and contaminants removed before heat recovery, by a gas phase chemical reaction at peak saturation temperatures. Flue gas ingredients such as sulfur dioxide, can be removed by scrubbing with water containing alkaline solutions such as calcium hydroxide, magnesium hydroxide, sodium hydroxide or sodium carbonate at the peak saturation temperature. This enables separation and removal of resulting chemicals such as the calcium sulfite, magnesium sulfite or sodium sulfite produced in the form of a solution or slurry at relatively high concentrations for disposal or recovery. By removing such chemicals and contaminants by chemical scrubbing previous to heat recovery, contamination of the condensate produced in condensing the water vapor in the heat recovery stage is avoided and air pollution prevented.

The third method of scrubbing is done following heat recovery and is used where lower temperatures are desired to facilitate chemical absorption and chemical recovery. This latter method is adaptable, for instance, for recovering sulfur dioxide with ammonia for ammonia bisulfite cooking liquor makeup in an ammonia base pulp mill recovery system. The lower temperatures reduce the ammonia losses.

Scrubbing with or without the addition of chemicals such as ammonia may be carried out in a second stage of heat recovery. Due to the decreasing rate of heat recovery at the lower temperatures, two or more stages of heat recovery reduce condensate circulation requirements at the lower temperatures and enable high circulation rates at the higher temperatures. This increases the heat recovery potential of the higher temperature heat, improves heat recovery evaporation temperature differentials available, reduces heat exchanger requirements and permits more heat to be utilized for two or more stages of heat recovery vacuum evaporation.

The direct contact scrubbing, heat recovery scrubbing, and chemical recovery scrubbing may be done in a series of scrubbers, however, considerable savings are possible by utilizing a single multiple stage scrubber. The flue gas draft may be a forced draft system from the air supply system to the burner. A suction fan may also be used at the flue gas discharge and in many cases, both will be required. The scrubbers used may be venturi scrubbers, plate towers, packed towers or any scrubber design to meet individual requirements. For maximum economy, the heat recovery towers should be countercurrent units.

When all the heat generated from a burning operation is utilized for direct contact evaporation, the saturation temperatures of the flue gas following direct contact evaporation are normally in the 190° F. range. The saturated heat content and water vapor content will vary somewhat with the flue gas involved, but will be in the vicinity of 1,300 B.t.u. per pound of dry flue gas generated and will carry about 1.1 pounds of water vapor per pound of dry flue gas following direct contact evaporation.

When the flue gas is cooled to 160° F., the heat content is reduced to about 370 B.t.u. per pound of dry flue gas and the water vapor content is reduced to 0.3 pounds per pound of dry flue gas. Due to this condensation, over 70 percent of the heat is recoverable by using a countercurrent flow of condensate that is being heated from 155° to the 185° F. range. This condensate then becomes the heating media for heat recovery vacuum evaporation.

The condensate is then utilized in a heat exchanger to heat a circulating flow of the liquor being concentrated and which is evaporated at lower temperature and pressure conditions induced by vacuum equipment. For liquor evaporated in the 120° to 140° F. temperature range there is a sufficiently high temperature differential for very economical use of the heat exchanger surface for single effect evaporation and for two effect evaporation where conditions warrant.

In condensing the water vapor in the heat recovery system, advantage is taken of the latent heat of fuels and the high heat values can be utilized. The single effect heat recovery evaporator can usually double the evaporation possible by direct contact evaporation along. The low cost of the heat in using the commercial fuel direct, makes the unit competitive in operating heat costs with a four effect steam evaporator of equal evaporation capacity. When burning a disposal product, these heat costs for evaporation are eliminated entirely.

The heat recovery evaporator used may be a spray film, falling film, rising film, natural circulation, forced circulation, reverse cycle scale prevention or flash evaporator of a single or multiple effect. It can also be followed by an air contact evaporator utilizing the heat of the vapors produced to provide added evaporation, eliminate cooling water requirements and the thermal pollution normally encountered from evaporation systems.

The evaporation taking place in the heat recovery evaporator is carried out under vacuum conditions at relatively low evaporation temperatures. This reduces some of the scaling, polymerization, corrosion and product breakdown sometimes encountered in the atmospheric boiling temperature range.

If the vapors released by the heat recovery evaporator are contaminated with chemicals such as sulfur dioxide, they can be chemically scrubbed or neutralized in the vapor phase with water containing alkaline solutions such as calcium hydroxide in the same manner as the gas phase treatment of the flue gas at peak saturation temperatures previously mentioned. The ordinary single effect heat recovery step requires only one treatment and collection, while multiple effect evaporators require treatment at every stage. These contaminants can also be controlled in some cases by chemical pretreatment of the feed liquor with calcium hydroxide for instance so the contaminants such as sulfur dioxide are not released during evaporation.

The vapors released by the heat recovery evaporator or any other evaporator ordinarily require cooling water to condense the vapors either by direct contact in a barometric condenser or in a surface condenser. If this heat can not be utilized, the heated water becomes a source of thermal pollution when returned to the stream.

The cooling water requirements and the thermal pollution involved are eliminated by an air contact evaporator that cools the liquor being concentrated in it, so that it can be used as the cooling media in the surface condenser of the heat recovery vacuum evaporator. The liquor cooled to the 90° to 100° F. range by air contact evaporation is heated to the 120° to 125° F. range by the condensing vapors in the surface condenser. The heated liquor is then contacted countercurrently by a flow of air that is heated by the liquor. The heated air becomes saturated with water vapor picked up from the liquor and is discharged at temperatures in the 115° F. range. The liquor is cooled by the air and by the evaporation down to the 90° to 100° F. range where it is again used for cooling in the said surface condenser.

In the air contact evaporator, a pound of water is evaporated for every 1,200 to 1,600 B.t.u. of heat picked up in the surface condenser depending on atmospheric conditions. The B.t.u. requirements are the lowest in the summer and more air contact evaporation is possible. In the winter, when the B.t.u. requirements are the highest and air contact evaporation rates are reduced, the temperatures differentials available are higher and more heat can be recovered. This increases both the heat recovery evaporation and air contact evaporation to satisfy the increased winter heat demand and equalizes year round evaporation rates.

The air contact evaporator may also utilize the heat in the flue gas that can only be used at lower temperatures. Using air contact evaporation, the flue gas can be cooled to the 110° to 120° F. range and over 90 percent of the heat following direct contact evaporation can be used for air contact evaporation. In cooling the flue gas, it permits lower temperature scrubbing without added cooling water and thermal pollution. The recovery of chemicals and air pollution control is also improved at these lower temperatures.

The oxidation made possible by air contact evaporation is also of prime importance in some operations. For Kraft pulp mill spent black liquor, oxidation ties down sulfur compounds that would otherwise be released in direct contact evaporation and burning. The oxidation prevents the air pollution which otherwise would be involved and enables the recovery of these sulfur compounds otherwise lost to the atmosphere.

The air contact evaporation equipment may be a cooling tower, scrubber, trickel tower, oxidation tower, spray tower or any other tower performing one of these functions. It can be a natural draft tower or have forced or induced fans to provide air handling capacity.

The overall evaporation system incorporates direct contact evaporation, heat recovery vacuum evaporation and air contact evaporation using the same heat for each operation step. However, any one or two of these steps can be eliminated when waste heat is being utilized or when only limited evaporation is required.

The feed system can be varied to meet individual product requirements. Final concentration will be done in the direct contact evaporator when possible to enable handling liquor at lower concentration and viscosities in the vacuum and air contact evaporators. This will minimize heat transfer surface requirements and facilitate handling. When scaling, polymerization, carbonization or corrosion is encountered at the high concentration and temperature of direct contact evaporation, the final concentrating can be carried out in a heat recovery vacuum evaporator.

The chemicals released in burning, and picked up by the liquor during direct contact evaporation, may also influence the feed system. For instance, the calcium oxide in the fly ash released in burning pulp mill calcium base sulfite liquor will be picked up by the liquor during direct contact evaporation and tie down the organic acids and sulfur dioxide that would otherwise be released in evaporation. If, in the feed system, direct contact evaporation precedes vacuum evaporation, the liquor is thereby treated before vacuum evaporation and contamination of the released vapors and formed condensate is avoided. When the calcium base liquor is burned, the organic acids are decomposed and the sulfur dioxide is released and recovered by the flue gas scrubbing system.

Where the flue heat content is low, the heat recovery vacuum evaporation step can be eliminated and the direct and air contact systems utilized for evaporation. Following direct contact evaporation the heated condensate is used directly, in this case, to heat the liquor being concentrated and cooled by air contact evaporation. Where the moisture content of flue gas is already high, the direct contact evaporation step can be eliminated. Heat recovery vacuum evaporation can still be combined with air contact evaporation or either evaporation system used separately.

This permits a very versatile and economical use of heat discharged from the normal boiler, recovery boiler, direct contact evaporators, gas turbine or incinerator for evaporation purposes. It also enables scrubbing the air for pollution control and preventing thermal pollution from the evaporation process.

Various objects and advantages of the invention will become apparent to persons skilled in the art upon examination of the specifications and accompanying drawing.

DESCRIPTION OF THE PREFERRED EMBODIMENTS

Figure 1:
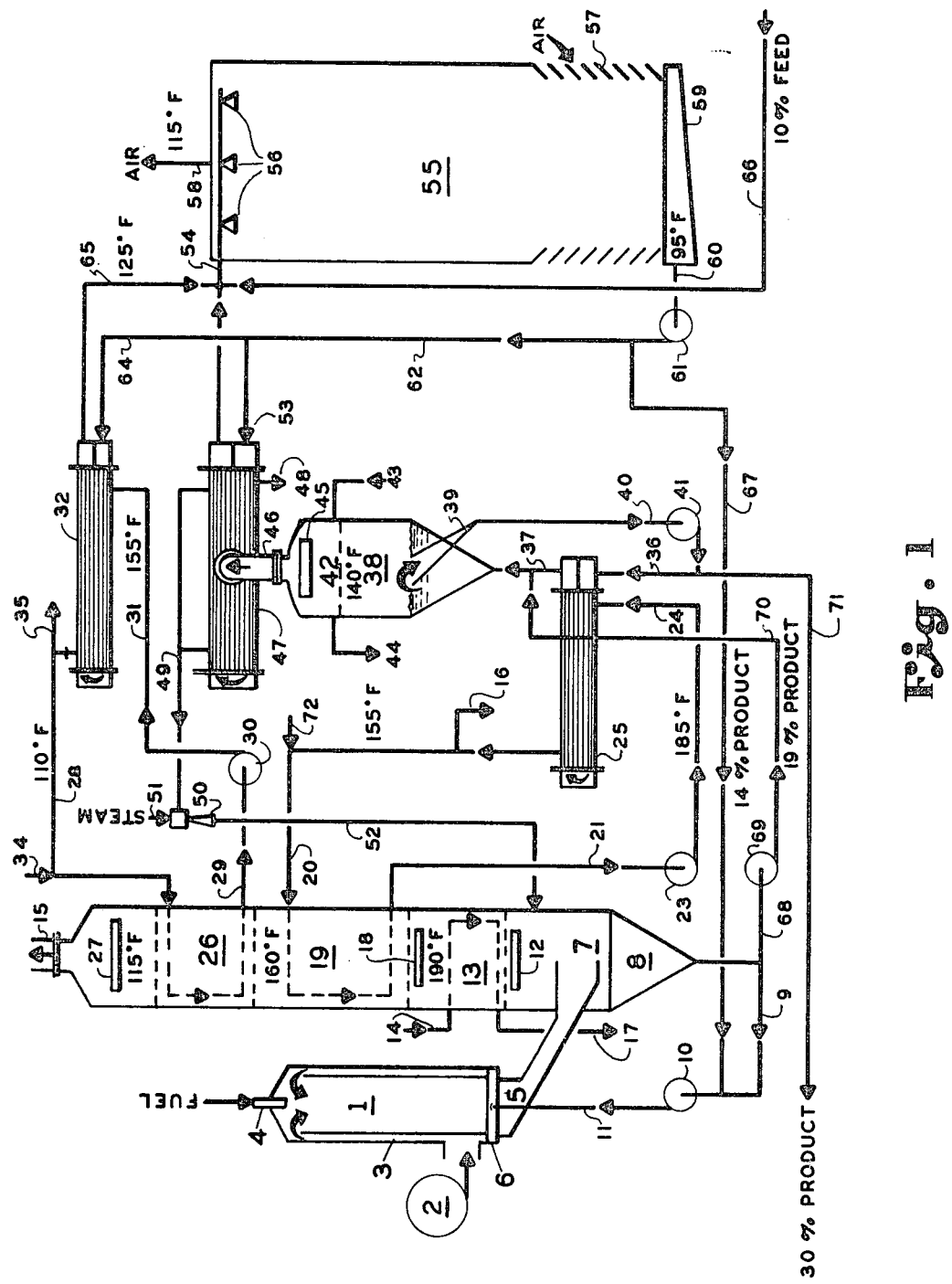
FIG. 1 is a schematic flow diagram showing direct contact evaporation, heat recovery vacuum evaporation and air contact evaporation incorporating the present invention in conjunction with a burner.

In the arrangement shown in FIG. 1, fuel is burned in a burner 1, utilizing air from fan 2, that is preheated in the outside burning chamber 3. The air contacts the fuel from fuel nozzle 4 to support the combustion that takes place in burner 1. The resulting hot flue gas passes into the venturi scrubber 5, where it contacts a circulating stream of the liquor being concentrated as it is supplied through the distributor ring 6. Evaporation from the liquor causes the liquor to become more concentrated, drops the temperature of the flue gas to the 190° F. range, and saturates the flue gas with water vapor as it enters chamber 7 of the first stage of the scrubber.

The circulating liquor concentrated by the direct contact evaporation is collected in collection chamber 8 and discharged through line 9 to pump 10. The liquor is returned through line 11 to the distributor ring 6 to complete the circulation cycle of the liquor being concentrated by direct contact evaporation.

Following this direct contact evaporation stage, the flue gas passes through separator 12 to prevent liquor carry through and goes to the second or chemical scrubbing stage 13. Chemical such as calcium hydroxide, magnesium hydroxide, sodium hydroxide, sodium carbonate and ammonium hydroxide may be added to water introduced at inlet 14 into chemical scrubber stage 13 at 190° F., and remove contaminants such as sulfur dioxide from the flue gas that might otherwise be carried out the flue gas discharge 15 to pollute the air or be discharged with the condensate through the condensate outlet 16. The chemicals and contaminants removed from the flue gas in the form of calcium sulfite, magnesium sulfite, sodium sulfite or ammonia sulfite solution or slurry by scrubbing in the second stage 13 of the scrubber are discharged through outlet 17 at high concentration for recovery or disposal.

Following chemical scrubbing, the flue gases, still at 190° F., continue upward through separator 18 to prevent carry through of chemicals into the third or heat recovery stage 19 of the scrubber. In the heat recovery stage 19, the flue gas is cooled to 160° F. by a circulating flow of condensate introduced into the scrubber through line 20 at 155° F. and discharged through line 21 at 185° F.

The heated condensate from the heat recovery scrubber stage 19, passes out line 21, through pump 23 and line 24 to heat exchanger 25. In heat exchanger 25, the condensate is cooled from 185° to 155° F. by a second stream of circulating liquor being concentrated by heat recovery vacuum evaporation. The cooled condensate is returned through line 20 to the heat recovery scrubber stage 19.

Chemicals such as calcium hydroxide may also be added to the condensate through inlet line 72 to remove contaminants such as sulfur dioxide and discharge the calcium bisulfite solution produced through outlet 16. However, the water vapor content of the flue gas is reduced by over 70 percent in being cooled from 190° to 160° F. The resulting excess condensate released in the heat recovery stage 19 is also discharged through outlet 16 and concentrations are reduced.

The flue gas leaving chamber 19 at 160° F. passes to chamber 26 and is cooled to 115° F. and discharged through separator 27 and outlet 15. Water enters through inlet line 28 at 110° F. to cool the flue gas and is heated to 155° F. and discharged through line 29, pump 30 and line 31 to heat exchanger 32 where it is cooled to 110° F. The cooled liquor is returned to chamber 26 through line 28. Chemicals such as calcium hydroxide may also be added through inlet 34 to the condensate to remove contaminants such as sulfur dioxide and discharge the calcium bisulfite solution produced with excess condensate through outlet 35.

The circulating liquor stream entering heat exchanger 25 through inlet line 36 is heated from 141° to 146° F. and is discharged through line 37 into the heat recovery vacuum evaporator 38. Here the liquor is cooled by evaporation from 146° to 141° F. and is carried through funnel 39, line 40, pump 41 and line 36 back to heat exchanger 25 to complete the circulation cycle of the liquor being concentrated by the heat recovery vacuum evaporator.

The vapors released in the vacuum evaporator chamber 38 at 140° F. are scrubbed in the treatment chamber 42 by chemicals such as calcium hydroxide added through inlet 43, to remove contaminants such as sulfur dioxide to produce a calcium sulfite solution or slurry that is discharged through outlet 44. The vapors pass up through separator 45 to remove and prevent carryover of entrained chemicals such as the calcium sulfite produced with the vapors through outlet 46 to the surface condenser 47 where the vapors are condensed. The entrained chemicals are held in chamber 42 and are removed through outlet 44. The condensate is removed through outlet 48 and the noncondensables drawn through line 49 by the vacuum eductor 50 utilizing steam at inlet 51. The steam and noncondensables are discharged through line 52 to the first stage scrubber chamber 7 for chemical recovery in stage 13 and heat recovery in stages 19 and 26.

The heat of condensation in the surface condenser 47 is used to heat a third circulating flow liquor being concentrated in this case by air contact evaporation. This liquor enters the surface condenser 47 through inlet line 53 and is heated from 95° to 125° F. by condensing vapors at 140° F. The heated liquor is discharged through line 54 to air contact evaporator 55 and enters through spray nozzles 56.

Air enters the air contact evaporator 55 through louvers 57 and flows countercurrent to the sprayed liquor and is heated thereby from atmospheric temperature to 115° F. The air, saturated with water vapor picked up from the liquor, is discharged through outlet 58. The liquor, cooled to 95° F. and concentrated due to the water removed, drops to the collection pan 59. The liquor is then discharged through line 60 to pump 61 and lines 62 and 53 to heat exchanger 47 to complete a circulating loop of a portion of the liquor being concentrated by air contact evaporation.

The remainder of the liquor flow from line 62 that does not go through line 53 goes through line 64 to heat exchanger 32 where it is heated from 95° to 125° F. The liquor is discharged from heat exchanger 32 through line 65 to line 54, joins the flow of liquor to the air contact evaporator 55 entering through spray nozzles 56.

The evaporation is thus carried out in three stages using the heat first for direct contact evaporation at scrubber stage 7, then for heat recovery vacuum evaporation at evaporator chamber 38 and again for air contact evaporation in air contact evaporator 55.

The feed system can be varied to meet individual requirements. FIG. 1 shows 10 percent feed liquor entering through line 66 to the air contact evaporation circulating system at line 54. The concentrated product at 14 percent solids is discharged from line 62 through line 67 and enters the direct contact evaporation system at line 9. The concentrated product, after direct contact evaporation to 19 percent solids, is discharged through line 68, pump 69 and line 70 to enter heat recovery evaporation system at line 37. The final product concentrated to 30 percent solids by vacuum evaporation is discharged through line 71. The feed may also go to (1) vacuum evaporation, (2) air contact evaporation, and (3) direct contact evaporation or varied in any other manner desired to meet individual needs.

Figure 2:
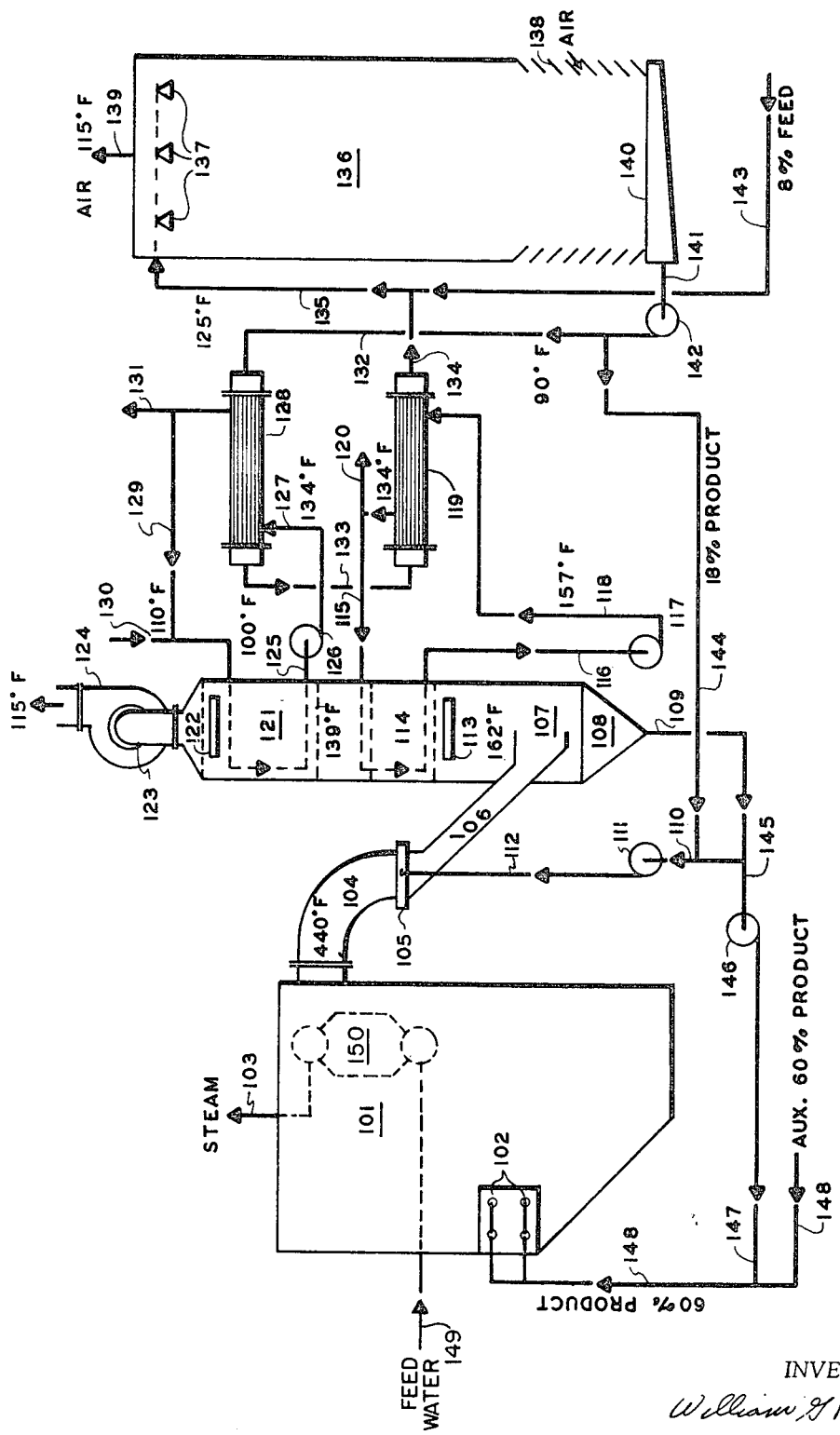
FIG. 2 is a schematic flow diagram showing direct contact evaporation and air contact evaporation incorporating the present invention in conjunction with a recovery boiler.

In the arrangement shown in FIG. 2, concentrated product such as spent pulp mill digester liquor at 60 percent solids is burned in a boiler 101 at nozzles 102 feed water is added through line 149, heated in an indirect coil 150 and steam is generated through outlet 103 with the flue gas discharged through outlet 104 at a temperature in the 440° F. range. The flue gases contact a circulating stream of liquor being concentrated by direct contact evaporation entering at distributor ring 105 and direct contact evaporation occurs in the venturi 106 of the scrubber first stage chamber 107.

The liquor concentrated by direct contact evaporation drops to the collection chamber 108 and is discharged through lines 109 and 110 to pump 111 and through line 112 back to the distributor ring 105 to complete the circulating loop of liquor being concentrated by direct contact evaporation.

The flue gas is cooled by direct contact evaporation to a saturation temperature of about 162° F. as it enters the first scrubber stage chamber 107, then passes through separator 113 to prevent liquor carry over into the heat recovery scrubber chamber 114. In the heat recovery scrubber chamber 114, the flue gas is cooled to 139° F. by a countercurrent flow of condensate that enters through line 115 at 134° F. and is heated to 157° F. and discharged through line 116 to pump 117 and through line 118 to heat exchanger 119. In heat exchanger 119, the condensate is cooled from 157° to 134° F. and circulated back to the heat recovery scrubbing chamber 114 through line 115. The excess condensate condensed in the heat recovery scrubbing chamber 114 is discharged from the circulating system through outlet line 120 to the pulp mill chemical recovery system.

The flue gas at 139° F. following heat recovery in chamber 114 moves to the third or chemical scrubbing chamber 121 where it is cooled from 139° to 115° F. by a countercurrent flow of chemical scrubbing liquor heated countercurrently from 110° to 134° F. The cooled and scrubbed flue gas passes through separator 122 to remove entrained chemicals and is discharged through outlet line 123 by fan 124 to the atmosphere.

The heated chemical scrubbing liquor at 134° F. is removed from the chemical scrubbing chamber 121 through line 125 to pump 126 and through line 127 to heat exchanger 128. In heat exchanger 128, the scrubbing liquor is cooled from 134° to 110° F. and is returned to the chemical recovery scrubbing chamber 121 through line 129 completing the chemical scrubbing circulating loop. Scrubbing chemicals such as aqua ammonia are added through inlet line 130 to remove sulfur dioxide from the flue gas and the ammonia bisulfite recovered and excess condensate are discharged through outlet line 131.

The heat is removed from heat exchangers 119 and 128 by circulating liquor being concentrated by air contact evaporation. Liquor cooled by air contact evaporation to 90° F. enters heat exchanger 128 through inlet line 132 and is heated to 100° F. and is discharged through line 133 to heat exchanger 119. In heat exchanger 119, the liquor is heated to 125° F. and is discharged through lines 134 and 135 to air contact evaporator 136 and distributed by spray nozzles 137.

Air enters the air contact evaporator 136 through louvers 138, flows countercurrent to the sprayed liquor and is heated thereby from atmospheric temperature to 115° F. The air, saturated with water vapor released by the liquor, is discharged through outlet 139. The liquor, cooled to 90° F. and concentrated due to the water removal, drops to collection pan 140. The liquor is then discharged through line 141 to pump 142 and through line 132 to heat exchanger 128 to complete the circulating loop of liquor being concentrated by air contact evaporation.

Feed liquor at 8 percent concentration is supplied through line 143 to line 135 of the air contact evaporation circulating system. Liquor concentrated to 18 percent solids by air contact evaporation is discharged from line 132 through line 144 and enters the direct contact evaporation circulating loop at line 110. Liquor concentrated to 60 percent by direct contact evaporation is discharged from line 109 through line 145 to pump 146 and through line 147 to join the 60 percent product auxiliary supply line 148 to the boiler burners 102.

A variety of equipment may be utilized in the methods defined in this invention. The burning equipment, direct contact evaporation equipment, heat and chemical recovery scrubbing equipment, heat recovery vacuum evaporation equipment and the air contact evaporation equipment can all be varied within the methods defined in this invention.

While several and specific embodiments of the inventive concept have been set forth herein, it is understood that the invention is not to be construed as limited thereby and that suitable modifications and variations may be made without departing from the spirit and scope of the invention as defined in the appended claims.

What I claim is:

1. A method for more efficiently using heat from flue gas generated by burning than is normally attained by direct contact evaporation which comprises providing a first circulating flow of preconcentrated liquor to be further concentrated, directly contacting said circulating liquor with hot flue gases, maintaining said flue gas in contact with said liquor for a sufficient period to raise the moisture content of the flue gas to near its saturation point while causing heat to transfer between said hot flue gases and said circulating liquor and concentrate said circulating liquor, subsequently cooling said hot flue gases by a second direct contact with a circulating water stream whereby the water is heated and the heat of condensation of the gas borne saturated vapor is recovered in the heated and collected water stream at the reduced saturation point of the cooled flue gas; providing a second circulating flow of preconcentrated liquor to be further concentrated in a flash evaporator, circulating the heated water stream resulting from said second direct contact through an indirect heat exchanger to heat said second circulating flow of liquor to be concentrated, inducing a vacuum in said second circulating flow of liquor to flash evaporate and further concentrate said second flow of liquor at a pressure and temperature below the pressure and temperature to which said second flow was raised in said heat exchanger, cooling and condensing the vapors from the flash evaporator of said second liquor flow in an indirect heat exchanger with a third flow of preconcentrated liquor, thereby heating the said third flow of liquor, directly contacting the heated third flow of liquor with a flow of air, maintaining contact for a sufficient period to cause heat and water vapor to transfer from the said third flow of liquor to said flow of air, raising the moisture content of said flow of air to near its saturation point and thereby cooling and concentrating said third flow of liquor.

2. The method set forth in claim 1, wherein the said flue gas cooled by direct contact with said circulating water stream are further cooled by a third direct contact with a second circulating water stream whereby the said second water stream is heated and the heat of condensation of the gas borne saturated vapor recovered in the heated and collected water stream at the reduced saturation point of the cooled flue gas; circulating the said second water stream resulting from said third direct contact through an indirect heat exchanger, cooling the said second water stream with a portion of the flow of the said third liquor flow of liquor being concentrated in said indirect heat exchanger, thereby heating a portion of said third flow of liquor being concentrated for air contact evaporation.

3. The method set forth in claim 1, wherein the said flue gas with moisture content raised to near its saturation point following direct contact evaporation with the first flow of liquor being concentrated, is contacted with a separate circulating water stream at near the flue gas saturation temperature to remove contaminants before said subsequent cooling.

* * * * *